United States Patent [19]

Harris

[11] Patent Number: 4,666,058

[45] Date of Patent: May 19, 1987

[54] OFF-ROAD VEHICLE FUEL CAP

[75] Inventor: Robert S. Harris, Connersville, Ind.

[73] Assignee: Stant Inc., Connersville, Ind.

[21] Appl. No.: 868,550

[22] Filed: May 30, 1986

[51] Int. Cl.[4] ............................................. B65D 51/16
[52] U.S. Cl. ................... 220/373; 220/202; 220/DIG. 33; 137/43
[58] Field of Search ............... 220/373, 360, 202, 203, 220/DIG. 33, DIG. 27, 303; 137/533.11, 533.13, 43

[56] References Cited

U.S. PATENT DOCUMENTS

| | | | |
|---|---|---|---|
| 3,391,818 | 7/1968 | Hairston | 220/373 X |
| 3,938,692 | 2/1976 | Crute | |
| 3,985,260 | 10/1976 | Evans | 220/203 |
| 4,000,828 | 1/1977 | Crute et al. | |
| 4,162,021 | 7/1979 | Crute | |
| 4,294,895 | 10/1981 | Atkins | 220/373 X |

Primary Examiner—Steven M. Pollard
Attorney, Agent, or Firm—Barnes & Thornburg

[57] ABSTRACT

A cap for closing the filler neck of a vehicle is provided. The cap includes a valve body and a vent adapted to allow a maximum amount of fuel vapor to vent to the atmosphere. The cap also includes a ball disposed within the valve body to seal the vent when the vehicle is rolled over to a substantially inverted position to prevent fuel from leaking from the cap. The cap further includes a baffle to prevent fuel from splashing through the vent when the vehicle is operated on a rough and uneven surface.

18 Claims, 3 Drawing Figures

OFF-ROAD VEHICLE FUEL CAP

The present invention relates to a vented fuel cap for a vehicle having a maximum venting capability and a roll-over safety feature. More particularly, the present invention relates to a vented fuel cap that combines a roll-over safety feature with a maximum venting capability and means to prevent sloshing fuel from accidently splashing through the vent in the cap.

Off-road vehicles, such as tractors and the like, generally have fuel tanks mounted such that the filler necks of the fuel tanks extend vertically upwardly from the tank. Generally, such filler necks are short, and the fuel tank is located directly beneath the filler neck, under the hood of the vehicle. Because such vehicles normally operate on rough, unimproved surfaces, such as agricultural fields, these vehicles are more susceptible to rollover than normal vehicles. Furthermore, such vehicles generally create higher than normal fuel agitation, and therefore generate more fuel vapor in the tank.

It is therefore desirable to provide such vehicles with a fuel cap that is able to allow the fuel tank to vent the fuel vapor to the atmosphere during normal operation. It is also desirable for the cap to seal the vents if the vehicle should roll over, in order to prevent fuel from pouring out of the vents in the cap.

The prior art discloses many different types of rollover fuel caps for use in the filler necks of vehicle fuel tanks.

One problem with the prior art caps is that the caps generally are not able to provide adequate venting capability under conditions where a large amount of fuel vapor is being formed.

Another problem with the prior art caps, and especially prior art caps that have attempted to increase the venting capability, is that when the fuel tank is full, or nearly full, fuel can be splashed out of the cap through the vent holes.

Another problem with the prior art caps is that fuel or fuel vapor can enter into the element that provides the roll-over safety feature and force the sealing means, usually a ball, to a position where it shuts off the venting capability of the cap. Such a sealing of the venting capability of the cap can cause the fuel vapor to build up within the fuel tank, with undesirable consequences resulting.

One object of the present invention is to provide a fuel cap in which the venting capability of the cap is maximized.

Another object of the present invention is to provide a fuel cap in which the problem of fuel splashing out of the cap through the vent holes is suppressed.

Yet another object of the present invention is to provide a fuel cap in which the problem of the roll-over sealing element prematurely being forced into the sealing position is eliminated.

According to the present invention, a fuel cap for closing the filler neck of a vehicle fuel tank is provided that includes a cover having an opening formed therethrough, and means connected to the cover providing a concentric housing that extends downwardly into the filler neck. The fuel cap further includes a valve body within the housing that extends downwardly into the filler neck. The valve body includes a chamber and is formed to include an upper opening to place the chamber in venting communication with the cover opening and vent openings to place the chamber in venting communication with the fuel tank. The chamber includes means to seal the upper opening when the filler neck is in a substantially inverted orientation. The cap further includes baffle means that surrounds the valve body to prevent sloshing fuel from entering the chamber through the vent openings and flowing out the upper opening and the cover opening.

One feature of the foregoing structure is that the baffle means surrounds the valve body to restrict the inflow of fuel towards the valve body. One advantage of this feature is that fuel is prevented from flowing through the valve body with sufficient force to cause the fuel to be forced out of the cap through the opening in the cover.

In preferred embodiments of the present invention, the baffle means is a cylindrically shaped baffle formed to include a plurality of openings having a first diameter and the valve body includes a plurality of openings having a second diameter, and the first diameter is substantially equal to the second diameter. One feature of the foregoing structure is that the holes in the baffle and the holes in the valve body are substantially equal in number and in size. One advantage of this feature is that the baffle and the valve body cooperate to maximize the venting capability of the cap.

Also in preferred embodiments of the present invention, the valve body is a cylindrically shaped enclosure having a side wall and the holes are formed in the center portion of the side wall. One feature of the foregoing structure is that the fuel vapor that flows into the valve body enters above the sealing means disposed within the valve body. One advantage of this feature is that the fuel vapor flowing into the valve body is less likely to force the sealing means upwardly to prematurely seal the venting capability of the cap.

Additional objects, features, and advantages of the invention will become apparent to those skilled in the art upon consideration of the following detailed description of a preferred embodiment exemplifying the best mode of carrying out the invention as presently perceived. The detailed description particularly refers to the accompanying figures in which.

Figure 1:
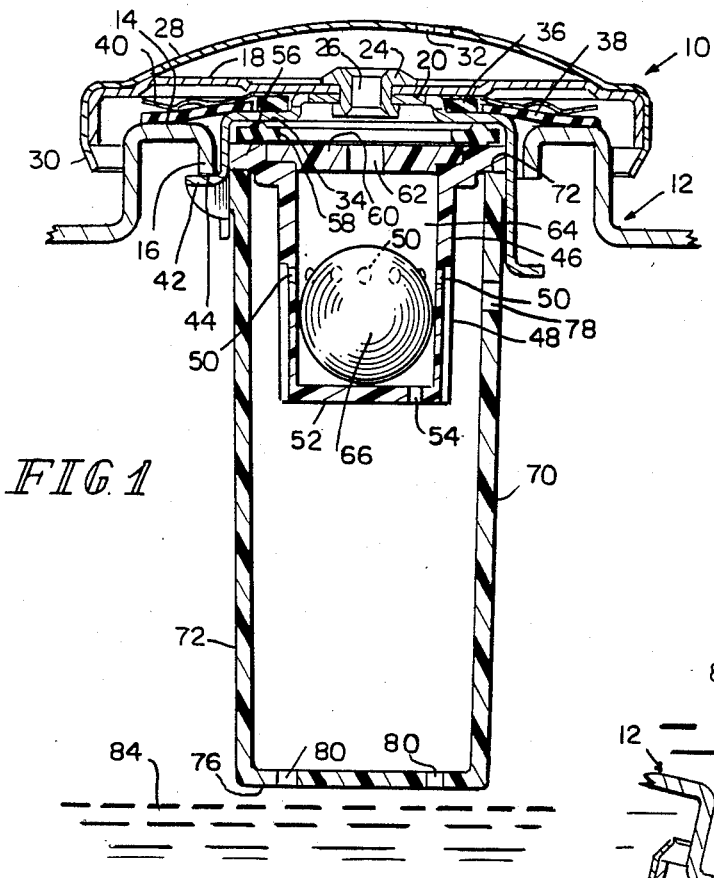
FIG. 1 is a transverse sectional view through the cap and filler neck with the fuel at a low level.

Referring now to the drawings, and particularly to FIG. 1, a fuel cap 10 is shown for closing a filler neck 12 of a fuel tank (not shown) containing fuel 84. The filler neck 12 is of the type having a peripherally and radially extending, upwardly facing sealing surface 14 concentric with the axis of the neck and, at the radially inner edge of the sealing surface 14, a downwardly turned, peripherally extending flange 16 which has a cam profile edge which will be discussed later. The cap includes a cover 18 to which a cup 20 is rigidly fastened by a concentric rivet 24, the cup 20 being a downwardly opening, generally concentric cup. The rivet 24 is formed to include a centrally disposed, axially extending aperture 26 therethrough.

A decorative cover 28 is disposed over the cover 18, and connected to the cover 18 by a turned in portion 30. The cover 28 includes an opening 32, the purpose of which will be discussed later. The cup 20 provides an upper shoulder 34 spaced axially apart from the cover 18 to define a space therebetween to receive an inner gasket 36, an outer gasket 38, and a diaphragm spring 40. The outer gasket 38 bears against both the shoulder 34 of the cup 20 and the sealing surface 14 of the filler neck 12 to provide a seal between the cup 20 and the filler neck 12.

Both of the gaskets 36, 38 may be synthetic rubber qaskets, and the diaphragm spring 40 may be a stainless steel or brass diaphragm spring for yieldably urging the outer peripheral edge of the outer gasket 38 axially downwardly to contact the sealing surface 14.

The cup 20 is formed with radially outwardly extending ears 43 which conventionally pass downwardly through notches (not shown) in the sealing surface 14 and the flange 16 of the filler neck 12 to engage a cam lock surface 44 defined by the distal edge of the flange 16. Twisting of the decorative cover 28 conventionally rotates the fuel cap 10 to move the cup 20 axially downwardly to press the outer gasket 38 against the sealing surface 14.

A valve body 46 is inserted into the open end of the cup 20. The valve body 46 includes a side wall 48 that is formed to include twelve holes 50 substantially near the center of the side wall 48. The valve body 46 also includes a bottom wall 52 that is formed to include a drain hole 54. The valve body 46 further includes an upper, radially outwardly extending shoulder 56 which captures a gasket 58 between its upper surface and the axially downwardly facing surface of the shoulder 34 of the cup 20. It will be understood that the gasket 58 is formed from a material similar to gaskets 36, 38. An upper wall 60 is fitted between the shoulder 56 and includes an aperture 62 formed therethrough. The aperture 62 is placed directly below the aperture 26 in the rivet 24 to permit venting communication between the aperture 62 and the aperture 26. As can be seen in FIG. 1, the diameter of the apertures 26, 62 are substantially large in relation to the size of the cap 10.

The upper wall 60, the side wall 48, and the bottom wall 52, cooperate to define a chamber 64 within the valve body 46. It will be understood that the holes 50 in the side wall 48 permit venting communication between the chamber 64 and the fuel tank while the apertures 26, 62 provide venting communication between the chamber 64 and the space between the decorative cover 28 and the cover 18. The opening 32 in the decorative cover 28 further permits venting communication from this space to the atmosphere.

Illustratively, the valve body 46 is 1.155 inches (29.337 mm.) in length and has an outside diameter of approximately 0.79 inches (20.06 mm.) and the holes 50 are located 0.625 inches (15.875 mm.) from the bottom wall 52, with each hole 50 having a diameter of 0.095 inches (2.413 mm.).

Figure 3:
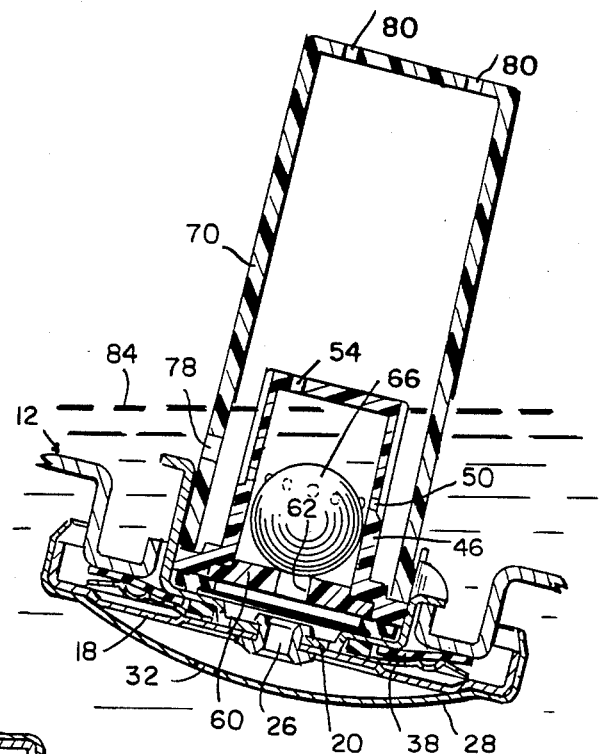
FIG. 3 is a view similar to FIG. 1 with the cap and filler neck in a substantially inverted position.

A ball 66 is disposed within the chamber 64 and sized to move axially within the chamber 64. The ball 66 is configured to seal the aperture 62 in the upper wall 60 when the cap 10 and the filler neck 12 are in a substantially inverted position, as shown in FIG. 3. This sealing of the aperture 62 by the ball 66 prevents fuel from flowing through the apertures 62, 26 and through the opening 32, should the vehicle overturn. Illustratively, the ball 66 has a diameter of 0.696 inches (17.70 mm.).

A cylindrically shaped baffle 70 is disposed around the valve body 46 with the upper edge 74 of the baffle 70 inserted into the cup 20 to engage the lower surface of the shoulder 56 of the valve body 46. The baffle 70 extends axially downwardly into the fuel tank a distance substantially greater than the valve body 46. The baffle 70 includes an elongated side wall 72 having four openings 78 formed therein. The baffle 70 also includes a bottom wall 76 having twelve openings 80 formed therein. The openings 80 in the bottom wall 76 are sized to be substantially identical to the holes 50 in the valve body 46.

Illustratively, the baffle 70 is 3.100 inches (78.740 mm.) in length and has an outside diameter of 1.400 inches (35.560 mm.). The openings 80 in the bottom wall 76 are in a generally circular pattern, with the circle having a diameter of approximately 0.750 inches (19.05 mm.), with each opening 80 having a diameter of 0.095 inches (2.413 mm.).

In operation, the cap 10 is installed in the filler neck 12 of a vehicle in a known manner so that the ears 42 of the cap 10 engage the cam lock surface 44 of the filler neck 12. The outer gasket 38, which is biased axially downwardly by the diaphragm spring 40, contacts the sealing surface 14 of the filler neck 12 to effect a seal between the cap 10 and the filler neck 12.

Referring now to FIG. 1, which shows the cap 10 and the filler neck 12 in a normal, upright position, it is desirable to let the vapor from the fuel 84 in the vehicle fuel tank (not shown) vent to the atmosphere. Because the vehicle fuel tank may be quite large, it will be understood that a considerable amount of fuel vapor could be generated. To allow this excess vapor to vent to the atmosphere, the openings 80 in the bottom wall 76 of the baffle 70 are matched in size and number to the openings 50 in the valve body 46, with the size and number being sufficient to conduct a large amount of vapor. As stated previously, apertures 62, 26 are formed substantially larger than normal to permit this vapor to enter the space between the decorative cover 28 and the cover 18. The opening 32 in the decorative cover 28 is provided to allow this vapor to escape directly to the atmosphere.

As best seen in FIG. 1, the holes 50 in the valve body 46 are located to allow any vapor or fuel 84 to enter the chamber 64 somewhat above the level of the ball 66. This orientation is designed to prevent the incoming vapor or fuel 84 from forcing the ball 66 upwardly to prematurely seal the aperture 62 in the upper wall 60 of the valve body 46. This premature sealing of the aperture 62 by the ball 66 is likely to occur if a large amount of vapor or fuel 84 were to enter the chamber 64 at a level below the ball 66. Should the aperture 62 be prematurely sealed, a potentially dangerous situation could exist in the fuel tank. This potentially dangerous situation is alleviated by the location of the holes 50 above the level of the ball 66.

Figure 2:
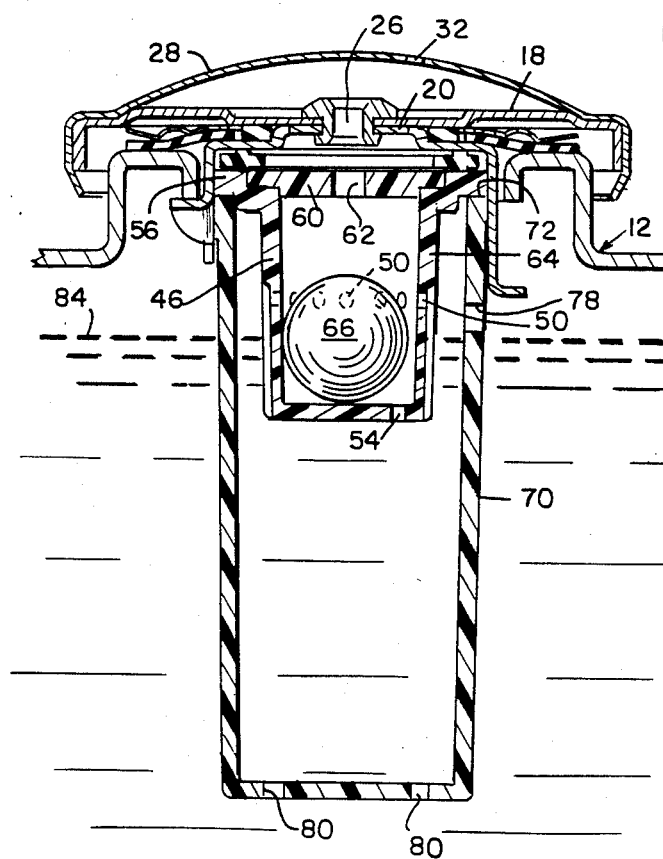
FIG. 2 is a view similar to FIG. 1 with the fuel at a high level.

Referring now to FIG. 2, which shows the fuel 84 at a somewhat higher level than in FIG. 1, it will be appreciated that the fuel 84 would be prone to enter the chamber 64 of the valve body 46 through the holes 50 if the vehicle were exposed to bumps during its movement because of uneven ground. Because of the large number of holes 50 in the valve body 46, this fuel would likely splash upwardly through the apertures 62, 26 and through the opening 32 and be spilled onto the vehicle. This spillage due to splashing of the fuel 84 is prevented by providing the baffle 70 around the valve body 46. Although the baffle 70 has holes 80 in its bottom wall 76 to allow fuel vapor to communicate with the holes 50 in the valve body 46, the baffle 70 acts to damp the splashing fuel 84 from entering the valve body 46 with sufficient force to be spilled from the fuel cap through the apertures 62, 26. Thus, the baffle 70 acts as a metering device to slow down the inflow of fuel toward the valve body 46.

Referring now to FIG. 3, if the vehicle rolls to a substantially inverted position because of an accident or the like, it will be appreciated that it is necessary to seal the aperture 62 in the valve body 46 to prevent fuel 84 from spilling out of the cap 10, which could cause serious fire problems. To prevent fuel 84 from spilling through the apertures 62, 26, the ball 66, being heavier than the fuel 84, will roll toward the upper walls 60 of the valve body 46 due to gravity to seal the aperture 62 in the upper wall 60. As long as the vehicle remains in the substantially inverted position, the ball 66 will remain over the aperture 62 to prevent fuel 84 from spilling onto the vehicle.

As the cap rolls from the upright position to the inverted position, the centerline of the ball 66 passes over the holes 50. Liquid fuel then enters behind the ball urging it toward the aperture 62 and increasing the closing force.

As can be seen from the above discussion, the cap 10 of the present invention provides increased fuel vapor venting capability, and yet alleviates potential problems created by this increased venting capability. The inclusion of the baffle 70 greatly reduces the chance of fuel 84 being forced out of the cap 10 through the apertures 62, 26. The high location of the holes 50 in the valve body 46 greatly reduces the chance that a large amount of fuel vapor will force the ball 66 upwardly to prematurely seal the aperture 62. In addition to these features, the cap 10 is also configured to seal the aperture 62 when the vehicle is rolled to a substantially inverted position.

Although the invention has been described in detail with reference to a preferred embodiment and specific examples, variations and modifications exist within the scope and spirit of the invention as described and defined in the following claims.

I claim:

1. A cap for closing the filler neck of a vehicle fuel tank containing fuel, the fuel tank having a normally generally upwardly extending filler neck with a peripherally and radially extending, upwardly facing sealing surface concentric with the neck, the cap comprising:
    a cover having an opening formed therethrough;
    means providing a concentric housing extending downwardly into said filler neck and connected to said cover;
    means providing a seal between the housing means and said sealing surface;
    a valve body within said housing and extending downwardly into said filler neck, said valve body having a side wall, an axially upper top wall, and an axially lower bottom wall, said walls cooperating to form a chamber inside the valve body, said axially upper top wall having an opening in communication with the opening formed in said cover and with the chamber, said side wall having a plurality of openings having a first diameter to place said chamber in communication with said fuel tank;
    means disposed in said chamber for sealing said opening in said top wall of said valve body when said filler neck is in a substantially inverted position; and
    means for preventing fuel in said fuel tank from splashing through said openings in said side wall of said valve body and entering said chamber, said means surrounding said valve body and extending downwardly into said filler neck.

2. The cap of claim 1, wherein said preventing means defines a cavity and includes at least one opening to place said cavity into communication with said fuel tank.

3. The cap of claim 2, wherein said preventing means has a plurality of openings having a second diameter for communication between said cavity and said fuel tank.

4. The cap of claim 3, wherein the number of openings in said side wall of said valve body and the number of openings in said preventing means is substantially equal, and wherein said first diameter is substantially equal to said second diameter.

5. The cap of claim 1, wherein said preventing means extends downwardly into said filler neck a distance greater than the distance the valve body extends downwardly into said filler neck.

6. The cap of claim 5, wherein said preventing means comprises a shell having a side wall and an axially lower bottom wall and the side wall is substantially concentric with the side wall of said valve body.

7. The cap of claim 1, wherein said sealing means disposed in said chamber comprises a ball that is heavier than the fuel in the fuel tank.

8. The cap of claim 7, wherein said chamber has a first diameter, said ball has a second diameter, and said second diameter is substantially equal to said first diameter.

9. The cap of claim 1, wherein said plurality of openings formed in said side wall of said valve body are located substantially near the axial center of said side wall.

10. The cap of claim 9, wherein said sealing means normally rests in the axial lower half of said valve body.

11. A cap for closing the filler neck of a vehicle fuel tank containing fuel, the fuel tank having a normally generally upwardly extending filler neck with a peripherally and radially extending, upwardly facing sealing surface, the cap comprising:
    a cover having an opening formed therethrough;
    a concentric housing extending downwardly into said filler neck and connected to said cover;
    means providing a seal between the housing means and said sealing surface;
    a valve body extending downwardly into said filler neck and including a chamber formed to have an upper opening to place said chamber in venting communication with said cover opening and other openings to place said chamber in venting communication with said fuel tank;
    means disposed within said chamber to seal said upper opening when said filler neck is in a substantially inverted orientation; and
    a baffle surrounding said valve body to prevent fuel in the fuel tank from entering said other openings in said valve body with sufficient force to cause said entering fuel to flow through said upper opening and said opening in said cover.

12. The cap of claim 11, wherein said openings in said valve body enter said chamber above the level of the sealing means when said cap is in a substantially upright position.

13. The cap of claim 11, wherein said baffle extends downwardly into said filler neck a first distance and said valve body extends downwardly into said filler neck a second distance, and said first distance is greater than said second distance.

14. The cap of claim 11, wherein said valve body has a cylindrically shaped side wall and said other openings are located substantially near the midpoint of said side wall.

15. The cap of claim 11, wherein said baffle has a bottom wall formed to include a plurality of openings having a first diameter.

16. The cap of claim 15, wherein there are a plurality of other openings having a second diameter formed in said valve body.

17. The cap of claim 16, wherein said first diameter is substantially equal to said second diameter.

18. The cap of claim 17, wherein the number of other openings in said valve body is substantially equal to the number of openings in said baffle.

* * * * *